US008458499B2

(12) United States Patent
Brey et al.

(10) Patent No.: US 8,458,499 B2
(45) Date of Patent: Jun. 4, 2013

(54) METHOD FOR REDUCING POWER STATE IN A COMPUTER SYSTEM OUT-OF-BAND WHEN A REQUEST FOR REDUCING THE POWER STATE IS NOT IMMEDIATELY SERVICEABLE IN BAND ACCORDING TO A PRIORITY OF THE REQUEST

(75) Inventors: Thomas M. Brey, Cary, NC (US); Ajay Dholakia, Cary, NC (US); Scott N. Dunham, Raleigh, NC (US); Sumeet Kochar, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 12/537,933

(22) Filed: Aug. 7, 2009

(65) Prior Publication Data
US 2011/0035611 A1 Feb. 10, 2011

(51) Int. Cl.
*G06F 1/26* (2006.01)
*G06F 1/32* (2006.01)

(52) U.S. Cl.
USPC .................................................. 713/320

(58) Field of Classification Search
USPC .................................................. 713/320
See application file for complete search history.

(56) References Cited

U.S. PATENT DOCUMENTS

| 5,812,860 | A | 9/1998 | Horden et al. |
| 6,131,166 | A | 10/2000 | Wong-Insley |
| 6,360,327 | B1 * | 3/2002 | Hobson ........................ 713/300 |
| 6,446,213 | B1 | 9/2002 | Yamaki |
| 7,051,215 | B2 | 5/2006 | Zimmer et al. |
| 7,051,218 | B1 | 5/2006 | Gulick et al. |
| 7,174,468 | B2 | 2/2007 | Gary et al. |
| 7,383,450 | B2 | 6/2008 | Rothman et al. |
| 7,386,743 | B2 | 6/2008 | Bahali et al. |
| 7,421,599 | B2 | 9/2008 | Bahali et al. |
| 2004/0128569 | A1 | 7/2004 | Wyatt et al. |
| 2004/0255171 | A1 | 12/2004 | Zimmer et al. |
| 2006/0150009 | A1 * | 7/2006 | Takemori ........................ 714/12 |
| 2007/0300083 | A1 | 12/2007 | Goodrum et al. |
| 2008/0234873 | A1 | 9/2008 | Gorbatov et al. |
| 2008/0294920 | A1 | 11/2008 | Hatasaki et al. |
| 2008/0301479 | A1 | 12/2008 | Wood |
| 2008/0320322 | A1 | 12/2008 | Green et al. |

(Continued)

OTHER PUBLICATIONS

PCT/EP2010/060467, "PCT International Search Report and Written Opinion of the International Searching Authority", EPO, mailed on Nov. 4, 2010, 13 pages.

*Primary Examiner* — Thomas Lee
*Assistant Examiner* — Xuxing Chen
(74) *Attorney, Agent, or Firm* — Cynthia G. Seal; Jeffrey L. Streets (57) ABSTRACT

One embodiment provides a method of managing power in a computer system. A device of the computer system is operated at a selected power-state. The power consumption of the computer system is monitored. If the power consumption of the computer system is approaching or has exceeded a power cap selected for the computer system, then a request to reduce the power-state for the device is generated in response. The operating system is used to service the request to reduce the power-state according to the priority of the request. The reduced power state is forced out-of-band following the request to reduce the power-state if the request is not immediately serviceable by the operating system. Different approaches can be taken to force the reduced power state, using, for example, system management mode or a platform environment control interface.

20 Claims, 4 Drawing Sheets

U.S. PATENT DOCUMENTS

2009/0055665 A1 2/2009 Maglione et al.
2009/0150693 A1 6/2009 Kashyap et al.
2009/0259863 A1* 10/2009 Williams et al. ............... 713/323
2010/0037077 A1* 2/2010 Kashyap ....................... 713/330

* cited by examiner

METHOD FOR REDUCING POWER STATE IN A COMPUTER SYSTEM OUT-OF-BAND WHEN A REQUEST FOR REDUCING THE POWER STATE IS NOT IMMEDIATELY SERVICEABLE IN BAND ACCORDING TO A PRIORITY OF THE REQUEST

BACKGROUND OF THE INVENTION

1. Field of the Invention

The present invention relates to power management in computer systems.

2. Background of the Related Art

The power consumed by a computer system represents a significant portion of the operational cost of that system. The cost of powering a computer system represents a significant portion of the overall ownership expense. The cost of cooling a computer system is another significant cost component, because computer systems generate heat in relation to the amount of power consumed, and because sufficient cooling infrastructure must be provided to cool the system. Such costs are particularly sizeable in a datacenter, which may include as many as tens of hundreds of high-power, rack-mounted servers mounted in multiple, high-density chassis or racks. Therefore, power management is an important consideration in the design, development, and operation of computer systems.

Power in a computer system is commonly managed on multiple levels. In a datacenter, for example, the total power allotted to the entire datacenter may fluctuate according to time-varying energy costs. The power allotted to the datacenter may be subdivided among multiple racks and among the rack-mounted chassis in the datacenter. Power to the servers within a particular chassis may be managed using a management module shared by the servers in that chassis, for example by establishing a variable power cap may be enforced upon each server. The server power caps may be individually varied by the management module to satisfy the demands placed on each server, while keeping power consumption within the power limit set for the chassis. Within a particular server, power to individual devices may be managed by the operating system to optimize power consumption, such as to reduce power consumption to idle devices.

Power management includes both hardware and software aspects. The amount of power used by system devices may be controlled "in-band," "out-of-band," or a combination thereof. By definition, in-band methods are implemented by the operating system (OS), while out-of-band methods are implemented by the platform, bypassing the OS. For example, a system configured according to the standardized Advanced Configuration and Power Interface (ACPI) specification may be managed out-of-band by a Baseboard Management Controller (BMC) or managed in-band according to Operating System-directed configuration and Power Management (OSPM).

BRIEF SUMMARY OF THE INVENTION

Embodiments of the present invention include methods and related software for managing power in a computer system using a combination of in-band and out-of-band steps. A power management method may be implemented, for example, by a computer program product including computer usable program code, wherein in-band steps are performed by computer usable program code included with an operating system and out-of-band steps are performed by computer usable program code not included with the operating system. In one embodiment, a device of the computer system is operated at a selected power-state. The power consumption of the computer system is monitored. A request to reduce the power-state for the device is generated in response to identifying that the power consumption of the computer system is approaching or has exceeded a power cap selected for the computer system. The request to reduce the power-state is serviced in-band according to the priority of the request. The reduced power state is forced out-of-band following the generation of the request if the request is not immediately serviceable in-band.

DETAILED DESCRIPTION OF THE INVENTION

Embodiments of the present invention coordinate in-band and out-of-band power management, such as to synchronize between platform-initiated (out-of-band) power capping and power optimization performed by the operating system (in-band). For instance, as power caps are enforced in real-time using out-of-band techniques, the operating system is kept informed of such changes, so that the operating system may select power modes appropriate for the current power state settings of devices (e.g. processors and memory). This allows the operating system to schedule tasks in a more optimal fashion. In one example scenario, a method is used to control a CPU power state out-of-band (not using OS or Hypervisor processor instructions), while keeping the OS and CPU power state information coordinated.

Figure 1:
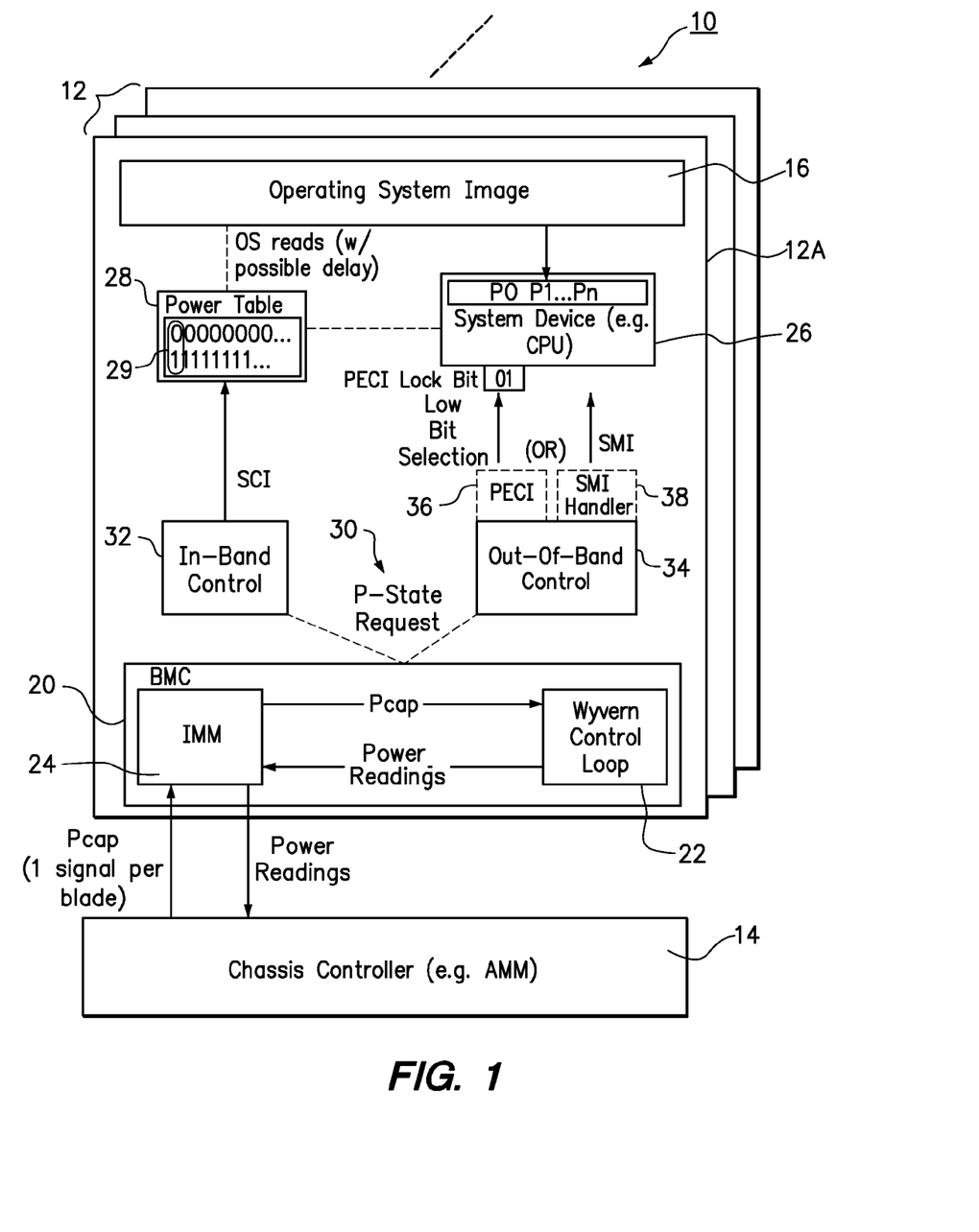
FIG. 1 is a schematic diagram of a computer system within which in-band and out-of-band power management duties may be shared according to an embodiment of the invention.

FIG. 1 is a schematic diagram of a computer system 10 in which power management duties may be shared and coordinated between an operating system 16 (in-band) and various platform hardware (out-of-band) according to an embodiment of the invention. The computer system 10 in this example embodiment includes multiple blade servers 12, one of which is diagrammed for reference as blade server 12A. The servers 12 may be housed in a rack-mountable chassis (not shown). Equipment in the chassis, including the blade servers 12 and support modules (not shown), may be administered by a chassis controller, which is embodied here as an advanced management module (AMM card) 14. Power within the computer system 10 may be managed at the chassis level by the AMM 14 and at the server level by various elements of the blade server 12A discussed herein. In-band power management in the computer system 10 includes the control of device power states by the operating system (OS) 16 on the server 12A. The OS 16 may be a Hypervisor if virtualization is desired. Out-of-band power management includes using a baseboard management controller (BMC) 20 on the server 12A to enforce a power cap (Pcap) on each server 12, as dynamically selected by a chassis controller 14. Various methods are described herein for coordinating in-band and out-of-band power management duties.

A system device 26 is a component of the server 12A that is operable according to a plurality of different power states (P-states), such as a processor or a dual in-line memory module (DIMM). By way of example, the system device 26 is assumed to be a processor, and specifically a central processing unit (CPU) 26. Each P-state has an associated upper power limit as determined by a particular voltage and operating frequency. The present power state of the CPU 26 is recorded in a register 29 of a power table 28. The P-states may be dynamically selected to control the power consumption of the CPU 26. The power consumption of the CPU 26 and any other system devices of the server 12A affects the power consumption of the server 12A. Thus, managing power to the server 12A may include dynamically varying the P-state of the devices of server 12A, including the system device 26.

The ACPI specification sets forth global system states, as well as device power states and performance states available to a processor or other device in a computer system. ACPI is a cornerstone of the Operating System-directed configuration and Power Management specification (OSPM). OSPM is a model of power and system management in which the operating system (OS) plays a central role and uses global information to optimize system behavior for the task at hand. ACPI describes hardware interfaces in terms abstract enough to allow flexible and innovative hardware implementations and concrete enough to allow shrink-wrap OS code to use such hardware interfaces. Although ACPI provides a convenient model for the embodiments of the invention disclosed herein, the invention is not to be limited exclusively to the use of ACPI power states. Thus, future revisions to ACPI and the development of new or additional standards for power and performance state selection are also within the scope of the invention.

The global system states defined by ACPI range from system state G0 (Working) to system state G3 (Mechanical Off). System state G0 (Working) is a computer state where the system dispatches user mode (application) threads and they execute. In system state G0, peripheral devices are having their power state changed dynamically. The user can select, through some user interface, various performance/power characteristics of the system to have the software optimize for performance or battery life. The system responds to external events in real time.

The device power states defined by ACPI range from D0 to D3. Device power state D0 (Fully On) is assumed to be the highest level of power consumption, wherein the device is completely active and responsive. The meaning of the D1, D2, and D3 hot device states is defined by each device class. Many device classes may not define D1 or D2. In general, device power state D1 is expected to save more power than device power state D0, device power state D2 is expected to save more power than device power state D1, and device power state D3 hot is expected to save more power than device power state D2. In the D3 (off) state, power is fully removed from the device.

The processor power states defined by ACPI are processor power consumption and thermal management states within the global working state G0, and range from processor power states C0 to C3. In processor power state C0 (Executing), the processor executes instructions. Processor power state C1 puts the processor in a lowest-latency, non-executing power state. Processor power state C2 is a non-executing power state that offers improved power savings over the C1 processor power state. The worst-case hardware latency for C2 is provided via the ACPI system firmware, and the operating software can use this information to determine when the processor power state C1 should be used instead of the processor power state C2. Processor power state C3 offers improved power savings over the processor power states C1 and C2. The worst-case hardware latency for processor power state C3 is provided via the ACPI system firmware and the operating software can use this information to determine when processor power state C2 should be used instead of processor power state C3.

ACPI further defines device and processor performance states P0 to Pn, which are power consumption and capability states within the executing power state C0 for processors and the active power state D0 for devices. According to ACPI, processors and devices may define support for an arbitrary number "n" of performance states not to exceed sixteen. Performance states P0 to Pn following a decreasing order of power and performance. A device or processor in performance state P0 uses its maximum performance capability and may consume maximum power. In performance state P1, the performance capability of a device or processor is limited below its maximum and consumes less than maximum power than in performance state P0. In performance state Pn, the performance capability of a device or processor is at its minimum level and consumes minimal power while remaining in an active state.

In one embodiment, the power state of a device is defined by the nominal "power states" C1 through C3 as set forth by ACPI, and is further sub-defined by the particular performances states P0 through Pn within the active/executing power state D0 or C0. Thus, for example, a processor operating at ACPI power state C0 and performance state P0 would be in a higher power state than the same processor when operating at power state C0 in performance state P1, since the processor will have a higher power and performance level at performance state P0 than at performance state P1.

The power table 28 describes motherboard devices, their power states, the power planes the devices are connected to, and controls for putting devices into different power states. To change the power state of the CPU 26, the BMC 20 may raise or lower the power state for the CPU 26 by generating a P-state request 30. The P-state request may be serviced using either an in-band control module 32 or an out-of-band control module 34. The in-band control module may include an I/O Controller Hub (ICH) having a General Purpose Input pin (GPI), which is configured for generating a Service Control Interrupt (SCI). An SCI is a system interrupt used by hardware to notify the OS 16 of ACPI events. The SCI is an active, low, shareable, level interrupt. The OS 16 will respond to an SCI by writing to the power table 28, adjusting the P-state register 29 to reflect the current power state of the CPU 26. However, response time could be indeterminate, as the OS 16 must context switch from what it is currently servicing, and may first service higher-priority interrupts.

Ordinarily, under OPMS, the OS 26 has exclusive control over the power table 18. However, the P-state request generated by the BMC 20 is alternatively capable of being processed out-of-band by out-of-band control module 34. The out-of-band control module 34 may include, for example, either a Platform Environmental Control Interface (PECI) 36 or an SMI handler 38. If the SMI handler 38 were handling the P-state request, the SMI handler 38 would respond to the P-state request by generating a system management interrupt (SMI). An SMI is an OS-transparent interrupt that causes the server 12A to enter system management mode (SMM). SMM is an operating mode in which all normal execution (including the OS 16) is suspended, and separate software (usually, firmware or a hardware-assisted debugger) is executed in high-privilege mode. By comparison, the PECI 36 is a single wire bus between the processor and the chipset or other system monitoring device. The PECI is designed specifically to convey system management information from a processor such as the CPU 26. The PECI specification provides a specific command conventionally set to discover, enumerate devices, and read the temperature. CPUs presently use a PECI interface for more than reading CPU temperature. For example, the PECI may also be used to read and write a subset of registers inside the CPU 26. Further information on PECI may be found, for example, in Intel's Platform Environment Control Interface (PECI) Specification. Here, the PECI is used to force a reduced power state out-of-band using the register read/write capabilities.

When the P-state request is serviced by the out-of-band control module 34 (either PECI 36 or SMI handler 38), the reduced power state is forced, without the occasional delays that can occur when an OS services an SCI. As implemented in current CPUs, the PECI 36 will only allow the highest performance or maximum throttle settings of the CPU 26 to be selected; intermediate states cannot be selected by the PECI 36. However, the inability to select intermediate states is a limitation only of the feature set on currently available CPUs, and not an architectural or technical limitation. Thus, future-devised CPUs may allow the PECI 36 to select intermediate states. By contrast, the SMI handler 38 is currently capable of selecting any of the power states available to the CPU 26. When using currently-available CPUs, therefore, the more complete control of the P-state provided by the SMI handler 38 may be preferred for that reason.

One aspect of power management is to select system, power, and performance states that optimize power consumption in the server 12A. Conventionally, a platform compliant with the ACPI specification provides the OSPM with direct and exclusive control over the power management functions of a computer. Thus, under OSPM, the power table 28 on the server 12A would ordinarily be manipulated in-band using the OS 16. Registers 29 in the power table 28 reflect the currently selected power states for various devices including the CPU 26. Examples of power control functions defined by ACPI include mechanisms for putting the server 12A into and out of sleep states, and placing processors and other devices in low-power states while the OS is idle but not sleeping. When the server 12A is active, OSPM will transition devices and processors into different performance states to achieve a desirable balance between performance and energy conservation goals.

Another aspect of power management is enforcing power caps on each server 12 that are dynamically selected by the AMM 14. Power caps must be enforced in real-time, under very narrow time constraints, or the shutdown of equipment may occur, such as by a tripped circuit breaker, over-heating, or excessive drain of a UPS. Though the OS 16 is effective at optimizing power consumption within each blade server 12 over an extended period of time, an OS generally does not have the ability to consistently provide the very rapid response time required to manage power caps on the blade servers 12 in real-time, in addition to the existing duties of the OS 16 to perform other tasks. Therefore, the OS 16 is generally used to optimize the use of power, while out-of-band techniques are used to enforce the power caps.

A dynamic control loop may be implemented out-of-band by the BMC 20, for enforcing a power cap imposed on the blade server 12A by the management module. The BMC 20 is a specialized microcontroller that manages the interface between system management software and platform hardware according to the Intelligent Platform Management Interface (IPMI) architecture. The IPMI specification defines a set of common interfaces to a computer system that a system administrator can use to manage the computer system and monitor system health. IPMI operates independently of the operating system, i.e., out-of-band.

Here, the out-of-band management capabilities of the BMC 20 are used to enforce the dynamically selected power cap on the server 12 in real-time. The BMC 20 provides a precision measurement and feedback control system capable of adjusting power on a millisecond time scale. Two elements of the measurement and feedback control system used to enforce the power cap are a control loop 22 and an Integrated Management Module (IMM) 24. The control loop 22 monitors power consumption of the server 12 on a real-time basis, and reports power readings to the IMM 24. The power readings from all of the servers are communicated in real-time to the AMM 14. The AMM dynamically generates a Pcap signal for each server 12. The AMM 14 may independently select the value of the power cap for each server, or select equal power cap values for all the servers. In either case, the AMM 14 may select the power cap values so that the total power allocated to the servers 12 is not exceeded. The power cap for the server 12 is communicated back to the servers for enforcement by the respective BMCs 20.

The goals of power optimization using the OSPM and the platform-initiated power capping can cause power management conflicts. In the prior art, for example, OSPM power management and platform-initiated power capping action are independent processes that can lead to sub-optimal performance.

Figure 2A:
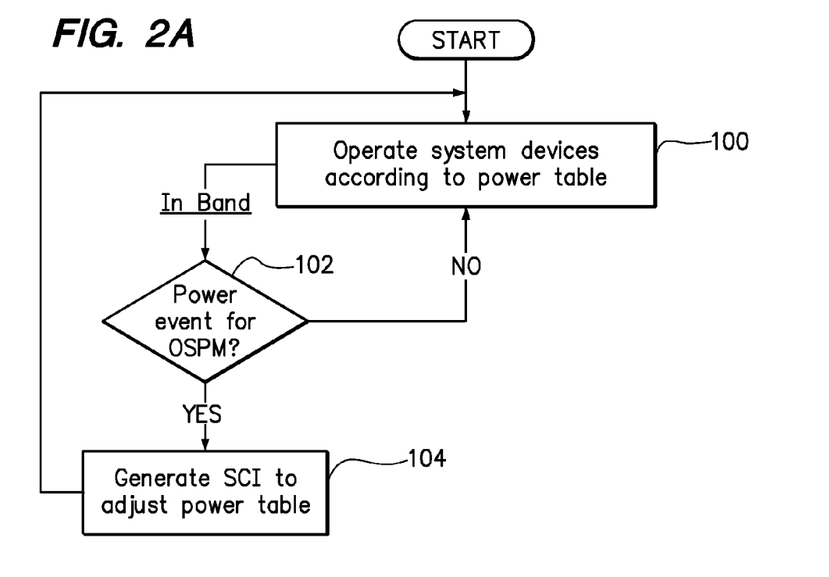
FIG. 2A is a flowchart outlining a method of in-band power management that includes generating a System Control Interrupt (SCI) as a part of the Operating System-directed configuration and Power Management specification (OSPM).
Figure 2B:
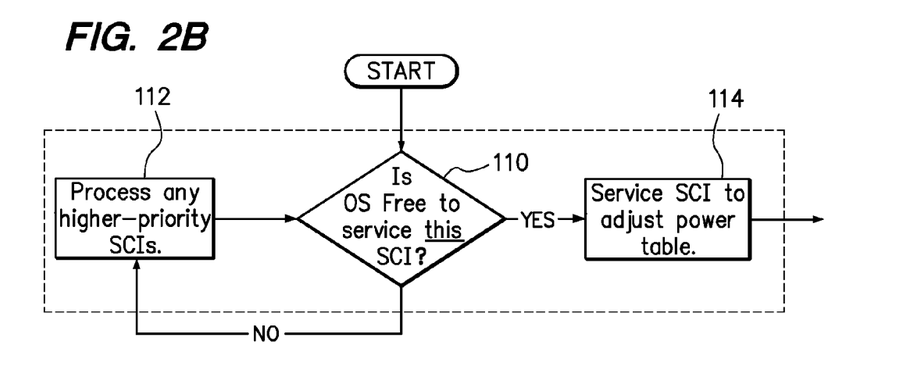
FIG. 2B is a flowchart outlining a method used by the Operating System (OS) to process SCIs according to priority.
Figure 2C:
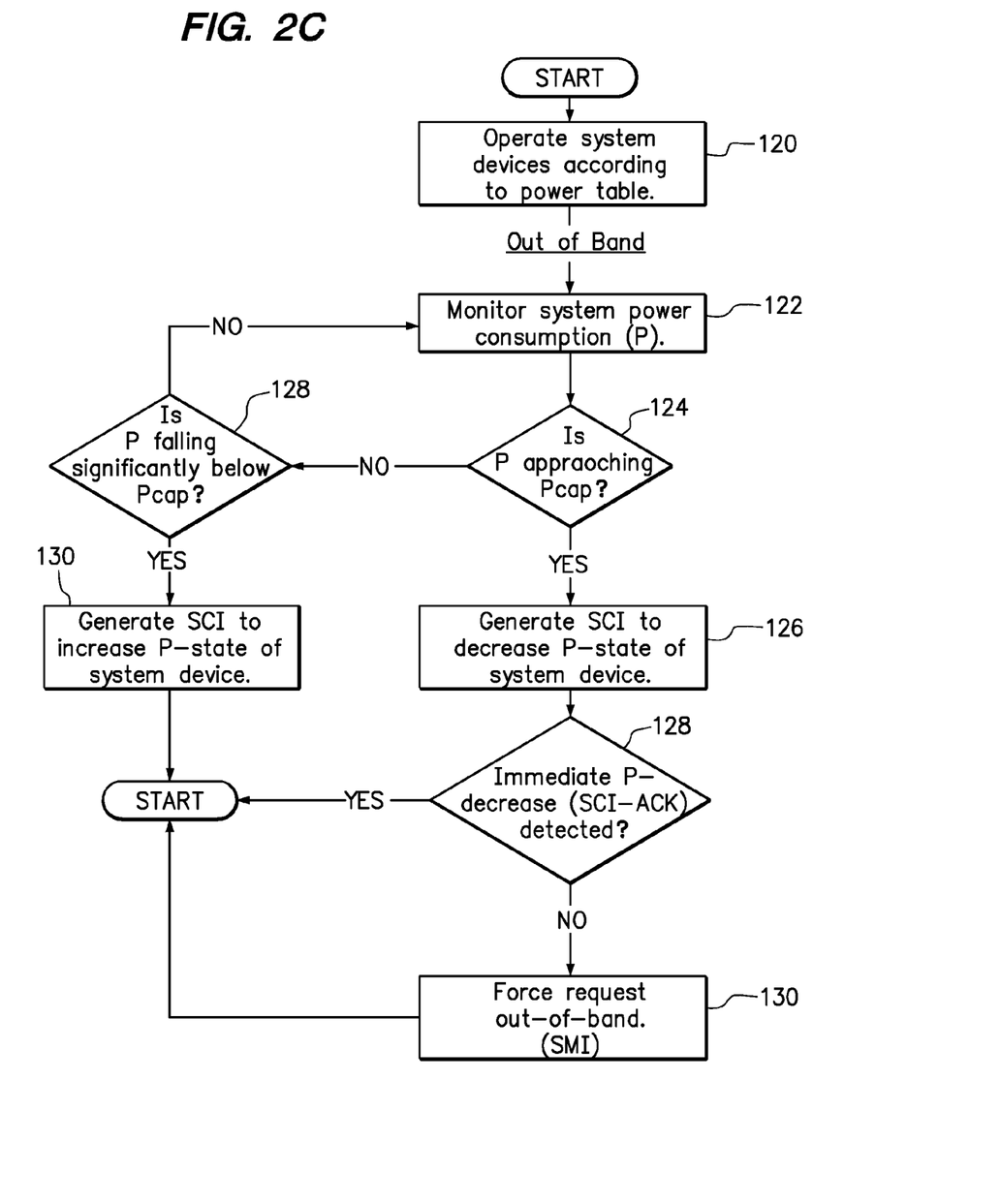
FIG. 2C is a flowchart outlining a method of primarily out-of-band power management using System Management Mode (SMM).
Figure 2D:
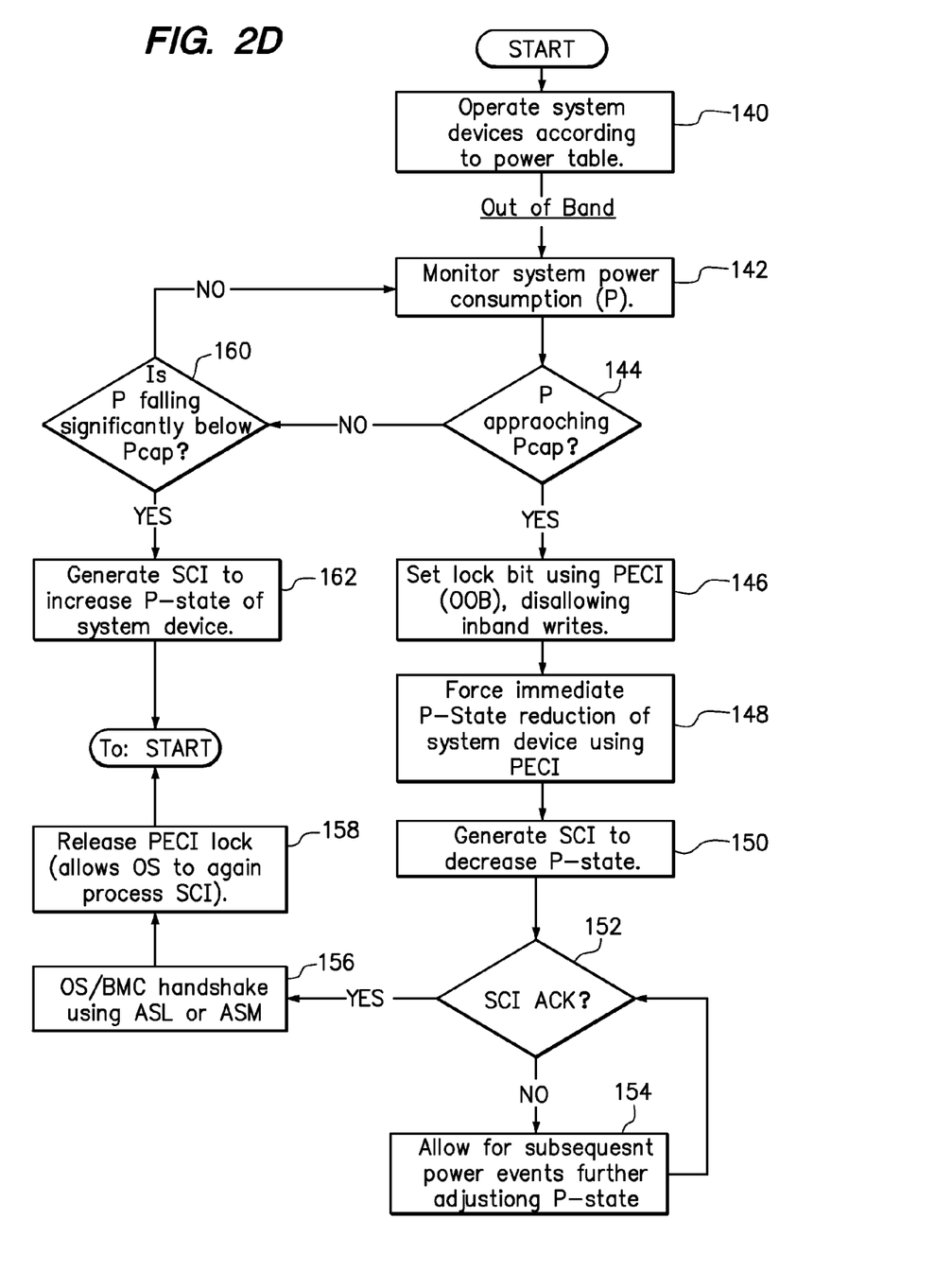
FIG. 2D is a flowchart outlining an alternative method of primarily out-of-band power management using a Platform Environment Control Interface (PECI).

FIGS. 2A-2D present flowcharts that collectively describe the coordination of power management between an operating system (in-band) and a computer platform (out-of-band). The methods may be applied to the computer system 10 of FIG. 1, for example. As an overview, FIG. 2A is a flowchart outlining a method of in-band power management that includes generating SCIs as a part of OSPM. FIG. 2B is a flowchart outlining a method used by the OS to process SCIs according to priority. FIGS. 2C and 2D are flowcharts outlining alternative methods of primarily out-of-band power management, but which also involve the contingent use of SCIs. The FIG. 2B method of processing the SCIs by priority may be used to process SCIs generated by any of the methods of FIGS. 2A, 2C, and 2D. Control over a computer system may be shared and coordinated between in-band methods and out-of-band methods, such as by the FIG. 2A method in combination with either of the FIG. 2C or FIG. 2D methods.

Referring to the in-band power management method outlined in FIG. 2A, system devices having variable power states are operated according to a power table in step 100. Conditional step 102 queries whether a power event has occurred for the OSPM. A power event is any event that might trigger the need for the system to adjust the power states of one or more components. For example, the entrance of a sleep state might trigger the need for a reduced power state in one or more devices. If a power event occurs, the system generates an SCI to adjust the power table accordingly, in step 104. The SCI generated in step 104 may be processed by the method of FIG. 2B.

In FIG. 2B, conditional step 110 queries whether the OS is free to service "this SCI," which refers to the SCI that was generated in response to one of the methods of FIG. 2A, 2C, or 2D. When the SCI is generated by step 104 of FIG. 2A, for example, step 110 queries whether the OS is free to service the SCI generated in step 104. If the OS is not available, due to other, higher-priority SCIs, then step 112 entails processing any higher-priority SCIs. When the OS is free to service the SCI, then the OS services the SCI to adjust the power table. Under the in-band power management method of FIG. 2A, it is acceptable for OS-induced delays, because the objectives of OSPM power management—e.g. optimization of power over time rather than nearly-instantaneous adjustments to enforce a power cap—can tolerate OS delays on the order of several seconds.

FIG. 2C outlines a power management method that allows out-of-band control to occur, when necessary, such as due to expected OS delays in processing an SCI. In step 120, system devices having variable power states are operated according to the power table. In step 122, the power consumption (P) of the computer system or sub-system (e.g. an individual server that contains the system devices) is monitored. Step 124 queries whether the system power consumption (P) is approaching a power cap selected for the computer system or subsystem. If P is approaching (or has exceeded) the relevant power cap, then an SCI is generated in step 126 to decrease the P-state of a system device. (An SCI could be generated to reduce the P-state of more than one system device, but only one system device is referenced here, to simplify discussion). The SCI may be processed by the FIG. 2C method (discussed above) if the OS is immediately available to do so.

Conditional step 128 queries whether an immediate decrease in system power consumption resulted in response to the SCI generated in step 126. An immediate decrease in system power consumption may be tested for by either the immediate receipt of an SCI acknowledgement (SCI-ACK), indicating that the OS was immediately available to service the SCI, or by a directly measured decrease in system power consumption. If an immediate decrease in system power consumption is detected, then the method may return to step 120. However, if an immediate decrease was not detected, a decreased power state is instead forced out-of-band by generating an SMI in step 130. The decreased power state is forced to avoid any problems such as a tripped circuit breaker, over-heating, or excessive drain of a UPS.

If P is not approaching Pcap in conditional step 124, then conditional step 132 queries whether P is instead falling significantly below Pcap. It is generally regarded as safe if P has fallen significantly below Pcap. Thus, an SCI is instead generated in step 128 to increase the P-state of the system device, and the SCI may be routinely processed by the OS according to the FIG. 2B method when the OS is available to do so.

FIG. 2D outlines an alternative power management method that allows out-of-band control to occur, when necessary, such as due to expected OS delays in processing an SCI. In step 140, system devices having variable power states are operated according to the power table. In step 142, the power consumption (P) of the computer system or sub-system (e.g. an individual server that contains the system devices) is monitored.

Conditional step 144 queries whether the system power consumption (P) is approaching a power cap (Pcap) selected for the computer system or subsystem. If P is approaching (or has exceeded) Pcap, then an SCI is not generated. Instead, a lock-bit is set in step 146 by the PECI (out-of-band), which disallows in-band writes by the OS. In step 148, an immediate P-state reduction is forced using the PECI. An SCI is generated in step 150 following the forced P-state reduction of step 148. The SCI can then be serviced by the OS according to the FIG. 2B method (discussed above). Processing of the SCI allows the OS to function as it is accustomed to doing, even though the P-state reduction was previously forced. In particular, the OS includes a CPU driver that receives the SCI, sees the new P-State cap, and uses that to initiate writes to the CPU registers to set the requested P-state. In an example sequence, the platform issues an SCI; ASL code runs and reads I/O register in a Wyvern control loop to see the new P-state cap the platform wants the OS to conform to; the ASL notifies the OS CPU driver of the change; and the OS driver receives the notification and honors the new Pcap, setting the P-states equal to or below the maximum allowed P-states.

Conditional step 152 checks for a SCI-ACK indicating receipt of the SCI by the OS. Step 154 provides for additional power events that may lead to further adjustments to the power table until the SCI-ACK is received. In response to the SCI-ACK, the OS and BMC then perform a handshake in step 156. The handshake is performed using ASL or ASM. AML is pseudo-code for a virtual machine supported by an ACPI-compatible OS and in which ACPI control methods and objects are written. ASL (ACPI Source Language) is the programming equivalent for AML. Following the handshake, the PECI lock is released in step 158, which allows the OS to again process SCIs. In other words, the handshake informs the platform that the OS has now conformed to the maximum allowed P-state desired by the platform, and that it is now safe to release the lock in step 158. When the lock is released, the OS may initiate power saving modes under low power-utilization scenarios, in which the OS can set P-states equal to or lower than the max P-state the platform allows.

Conditional step 160 queries whether P is instead decreasing significantly below Pcap. As with the FIG. 2C method, an emergency condition is generally not triggered when P falls significantly below Pcap. Thus, an SCI is instead generated in step 162 to increase the P-state of the system device, and the SCI may be routinely processed by the OS according to the FIG. 2B method when the OS is available to do so.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible storage medium having computer-usable program code stored on the storage medium.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing power in a computer system, comprising:
    operating a device of the computer system at a selected power-state;
    monitoring the power consumption of the computer system;
    dynamically generating a request to reduce the power-state for the device in response to identifying that the power consumption of the computer system is approaching a power cap selected for the computer system; and
    servicing each request to reduce the power-state in-band for which the request is immediately serviceable in-band according to the priority of the request and forcing a reduced power state out-of-band in response to the generation of each request for which the request is not immediately serviceable in-band according to the priority of the request.

2. The method of claim 1, wherein the step of generating a request to reduce the power-state for the device comprises generating a service control interrupt to reduce the power-state.

3. The method of claim 1, wherein the step of forcing the reduced power state out-of-band comprises:
    generating a service management interrupt;
    entering a system management mode temporarily suspending execution of an operating system; and
    using software separate from the operating system to reduce the power-state.

4. The method of claim 1, wherein the step of reducing the power state of the device comprises reducing one or both of a frequency and a voltage of the device.

5. The method of claim 1, further comprising:
forcing an immediate power state reduction out-of-band in response to identifying that the power consumption of the computer system has exceeded the power cap; and
subsequently informing the operating system of the reduced power-state.

6. The method of claim 5, further comprising using a Platform Environment Control Interface to force the immediate power state reduction out-of-band.

7. The method of claim 5, further comprising:
setting a lock-bit out-of-band, disallowing in-band writes to a power-state register and subsequently forcing the immediate power state reduction;
generating a service control interrupt after forcing the power state reduction; and
subsequently releasing the lock-bit.

8. The method of claim 7, further comprising:
performing a handshake between an operating system and a baseboard management controller; and
releasing the lock-bit in response to the handshake.

9. The method of claim 8, further comprising initiating a power saving mode upon releasing the lock-bit, including setting the power state equal to or lower than a maximum platform-selected power state.

10. The method of claim 6, further comprising using the Platform Environment Control Interface to select a maximum throttle setting of the device.

11. A computer program product including computer usable program code embodied on a non-transitory computer usable storage medium for managing power in a computer system, the computer program product including:
computer usable program code for selecting a power state at which to operate a device of the computer system;
computer usable program code for monitoring the power consumption of the computer system;
computer usable program code for dynamically generating a request to reduce the power-state for the device in response to identifying that the power consumption of the computer system is approaching a power cap selected for the computer system; and
computer usable program code included with an operating system for servicing each request to reduce the power-state in-band for which the request is immediately serviceable in-band according to the priority of the request; and
computer usable program code not included with the operating system for forcing a reduced power state out-of-band in response to the generation of each request for which the request is not immediately serviceable in-band according to the priority of the request.

12. The computer program product of claim 11, wherein the computer usable program code for generating a request to reduce the power-state for the device comprises computer usable program code for generating a service control interrupt to reduce the power-state.

13. The computer program product of claim 11, wherein the computer usable program code for forcing the reduced power state out-of-band comprises:
computer usable program code for generating a service management interrupt;
computer usable program code for entering a system management mode temporarily suspending execution of an operating system; and
computer usable program code not included with the operating system for reducing the power-state.

14. The computer program product of claim 11, wherein the computer usable program code for reducing the power state of the device comprises computer usable program code for reducing one or both of a frequency and a voltage of the device.

15. The computer program product of claim 11, further comprising:
computer usable program code not included with the operating system for forcing an immediate power state reduction out-of-band in response to identifying that the power consumption of the computer system has exceeded the power cap; and
computer usable program code for subsequently informing the operating system of the reduced power-state.

16. The computer program product of claim 15, further comprising computer usable program code not included with the operating system for forcing the immediate power state reduction out-of-band along a Platform Environment Control Interface.

17. The computer program product of claim 15, further comprising:
computer usable program code not included with the operating system for setting a lock-bit out-of-band, disallowing in-band writes to a power-state register and subsequently forcing the immediate power state reduction;
computer usable program code for generating a service control interrupt after forcing the power state reduction; and
computer usable program code for subsequently releasing the lock-bit.

18. The computer program product of claim 17, further comprising:
computer usable program code for performing a handshake between an operating system and a baseboard management controller; and
computer usable program code for releasing the lock-bit in response to the handshake.

19. The computer program product of claim 18, further comprising computer usable program code for initiating a power saving mode upon releasing the lock-bit, including setting the power state equal to or lower than a maximum platform-selected power state.

20. The computer program product of claim 16, further comprising computer usable program code for selecting a maximum throttle setting of the device using the Platform Environment Control Interface.

* * * * *